US006998065B1

(12) United States Patent
Hasegawa et al.

(10) Patent No.: US 6,998,065 B1
(45) Date of Patent: *Feb. 14, 2006

(54) FLUID COMPOSITIONS CONTAINING REFRIGERATOR OILS AND CHLORINE-FREE FLUOROCARBON REFRIGERANTS

(75) Inventors: Hiroshi Hasegawa, Yokohama (JP); Noboru Ishida, Yokohama (JP); Umekichi Sasaki, Yokohama (JP); Tatsuyuki Ishikawa, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/152,593

(22) Filed: Sep. 14, 1998

Related U.S. Application Data

(63) Continuation-in-part of application No. 08/539,001, filed on Oct. 4, 1995, now Pat. No. 6,582,621, which is a continuation of application No. 08/193,281, filed on Feb. 8, 1994, now abandoned, which is a continuation-in-part of application No. 08/019,177, filed on Jan. 28, 1993, now abandoned, which is a continuation of application No. 07/634,054, filed on Dec. 26, 1990, now abandoned.

(30) Foreign Application Priority Data

| Dec. 28, 1989 | (JP) | ................................. 1-341244 |
| Dec. 28, 1989 | (JP) | ................................. 1-341245 |
| Apr. 20, 1990 | (JP) | ................................. 2-105772 |
| May 15, 1990 | (JP) | ................................. 2-121133 |

(51) Int. Cl.
  *C09K 5/04* (2006.01)
  *C09K 5/00* (2006.01)
  *C10M 105/34* (2006.01)
  *C10M 105/38* (2006.01)

(52) U.S. Cl. ........................ 252/68; 252/67; 508/485; 508/495

(58) Field of Classification Search ................ 252/68, 252/67; 508/485, 495
See application file for complete search history.

(56) References Cited

U.S. PATENT DOCUMENTS

| RE19,265 | E | * | 8/1934 | Midgley, Jr. et al. ......... 62/114 |
| 2,807,155 | A | * | 9/1957 | Williamitis ................... 62/502 |
| 3,723,320 | A | * | 3/1973 | Herber et al. ................ 252/78.5 |
| 4,851,144 | A | * | 7/1989 | McGraw et al. ............... 252/68 |
| 4,923,806 | A | * | 5/1990 | Klodowski .................... 436/39 |
| 5,021,179 | A | * | 6/1991 | Zehler et al. ................. 252/68 |
| 5,096,606 | A | | 3/1992 | Hagihara et al. .............. 252/68 |
| 5,185,092 | A | | 2/1993 | Fukuda et al. ................ 252/56 |
| 5,202,044 | A | * | 4/1993 | Hagihara et al. .............. 252/68 |
| 5,211,884 | A | | 5/1993 | Bunemann et al. ............ 252/56 |
| 5,279,752 | A | * | 1/1994 | Hasegawa et al. ............ 252/68 |
| 5,391,311 | A | * | 2/1995 | Ishida et al. ................. 508/304 |
| 5,447,647 | A | * | 9/1995 | Ishida et al. ................. 252/68 |
| 5,464,550 | A | * | 11/1995 | Sasaki et al. ................. 252/68 |
| 5,512,198 | A | * | 4/1996 | Sasaki et al. ................. 252/68 |
| 5,620,950 | A | * | 4/1997 | Kamakura et al. ........... 508/485 |
| 5,653,909 | A | * | 8/1997 | Muraki et al. ................ 252/68 |
| 5,728,655 | A | * | 3/1998 | Muraki et al. ............... 508/304 |
| 5,746,933 | A | * | 5/1998 | Ishida et al. ................. 252/68 |
| 6,153,118 | A | * | 11/2000 | Hasegawa et al. ............ 252/68 |
| 6,207,071 | B1 | * | 3/2001 | Takigawa et al. ............. 252/68 |
| 6,251,300 | B1 | * | 6/2001 | Takigawa et al. ............. 252/67 |
| 6,410,492 | B1 | * | 6/2002 | Shimomura et al. ......... 508/485 |
| 6,551,523 | B1 | * | 4/2003 | Schnur ........................ 252/68 |
| 6,551,524 | B2 | * | 4/2003 | Schnur ........................ 252/68 |
| 6,582,621 | B1 | * | 6/2003 | Sasaki et al. ................. 252/68 |
| 6,828,286 | B2 | * | 12/2004 | Komiya et al. .............. 508/192 |
| 2002/0193262 | A1 | * | 12/2002 | Kaimai et al. .............. 508/485 |

FOREIGN PATENT DOCUMENTS

| DE | 133966 | * | 1/1979 |
| EP | 430657 A1 | * | 6/1991 |
| EP | 435253 A1 | | 7/1991 |
| EP | 445610 A1 | | 9/1991 |
| EP | 448402 A2 | * | 9/1991 |
| EP | 480479 A2 | * | 4/1992 |
| EP | 514988 A2 | * | 11/1992 |
| EP | 536814 A1 | | 4/1993 |
| JP | 55-155093 A | * | 12/1980 |
| JP | 62-292895 A | * | 12/1987 |
| JP | 62-292895 A | * | 12/1987 |
| RU | 208868 | | 9/1965 |
| WO | 90/12849 | * | 11/1990 |

OTHER PUBLICATIONS

K. S. Sanvordenker, Materials Compatability of R-134a in Refrigerant Systems, CFCs: Time of Transition, 1989, pp. 211-216

K. S. Sanvordenker, et al., A Review of Synthetic Oils for Refrigeration Use, ASHREA Symposium Bulletin NA-72-5,19, pp. 14-19 (date unknown).

* cited by examiner

*Primary Examiner*—Alan Diamond
(74) *Attorney, Agent, or Firm*—Bucknam and Archer

(57) ABSTRACT

A refrigerator oil for use in compressors using therein a hydrogen-containing halogenocarbon as a refrigerant, consisting essentially of as a base oil at least one kind of an ester selected from the group consisting of a specific pentaerythritol ester such as an ester of pentaerythritol with a mono- or dicarboxylic acid, a specific polyol ester such as an ester of trimethylolethane with a mono- or dicarboxylic acid, a specific ester such as an ester of ethylene glycol and a dicarboxylic acid, and a specific polyol ester synthesized from a neopentyl type polyhydric alcohol, a monocarboxylic acid and a dicarboxylic acid; and further comprising at least one kind of an epoxy compound.

8 Claims, No Drawings

FLUID COMPOSITIONS CONTAINING REFRIGERATOR OILS AND CHLORINE-FREE FLUOROCARBON REFRIGERANTS

This application is a continuation-in-part of Ser. No. 08/539,001 filed Oct. 4, 1995 now U.S. Pat. No. 6,582,621, which is a continuation of Ser. No. 08/193,281 filed Feb. 8, 1994 now abandoned, which is a continuation-in-part of Ser. No. 08/019,177 filed Jan. 28, 1993 now abandoned, which is a continuation of Ser. No. 07/634,054 filed Dec. 26, 1990 now abandoned.

1. FIELD OF THE INVENTION

This invention relates to a lubricating oil for compressors of refrigerators using therein a hydrogen-containing halogenocarbon as a refrigerant (the oil being hereinafter referred to as "a refrigerator oil for use with a hydrogen-containing halogenocarbon refrigerant") and, more specifically, it relates to such a refrigerator oil which comprises a specific ester as a base oil and is superior in various properties.

2. BACKGROUND OF THE PRIOR ART

Generally, naphthenic mineral oils, paraffinic mineral oils, alkylbenzenes, polyglycolic oils, ester oils and mixtures thereof, which have each a kinematic viscosity of 10–200 cSt at 40° C., as well as these oils incorporated with suitable additives have been used as refrigerator oils.

On the other hand, chlorofluorocarbons (CFCS) type refrigerants, such as CFC-11, CFC-12, CFC-113 and HCFC-22, have been used for refrigerators.

Of these CFCS, CFCS such as CFC-11, CFC-12 and CFC-113, which are obtained by substituting all the hydrogen atoms of hydrocarbons thereof by halogen atoms including chlorine atoms, may lead to the destruction of the ozone layer, and therefore, the use of the CFCS has been controlled. Accordingly, hydrogen-containing halogenocarbons, such as HFC-134a and HFC-152a, have been being used as substitutes for CFCs. HFC-134a is especially promising as a substitute refrigerant since it is similar in thermodynamic properties to CFC-12 which has heretofore been used in many kinds of refrigerators of home cold-storage chests, air-conditioners and the like.

Refrigerator oils require various properties, among which their compatibility with refrigerants is extremely important in regard to lubricity and system efficiency in refrigerators. However, conventional refrigerator oils comprising, as the base oils, naphthenic oils, paraffinic oils, alkylbenzenes, heretofore known ester oils and the like, are hardly compatible with hydrogen-containing halogenocarbons such as HFC-134a. Therefore, if these conventional refrigerator oils are used in combination with HFC-134a, the resulting mixture will separate into two layers at normal temperature so as to degrade the oil-returnability which is the most important within the refrigeration system and cause various troubles such as a decrease in refrigeration efficiency, deterioration of lubricity and the consequent seizure of the compressor within the system whereby the refrigerator oils are made unsuitable for use as such. In addition, polyglycolic oils are also known as refrigerator oils for their high viscosity index and are disclosed in, for example, JP-A-57-42119 and JP-A-61-52880 and JP-A-57-51795. However, the polyglycolic oils disclosed in these prior art publications are not fully compatible with HFC-134a thereby raising the same problems as above and rendering them unusable.

Further, U.S. Pat. No. 4,755,316 discloses polyglycolic refrigerator oils which are compatible with HFC-134a and U.S. Pat. No. 4,851,144 discloses refrigerator oils comprising a mixture of an ester and a polyglycol which are compatible with HFC-134a. In addition, the present inventors developed polyglycolic refrigerator oils which have excellent compatibility with HFC-134a as compared with conventional known refrigerator oils and, filed an application for a patent for the thus developed polyglycolic refrigerator oils and have already obtained a patent (U.S. Pat. No. 4,948,525) therefor. It has been found, however, that the polyglycolic oils raise problems as to their high compatibility with water and inferior electrical insulating property.

On the other hand, refrigerator oils used in compressors of home refrigerators and the like are required to have a high electrical insulating property. Among the known refrigerator oils, alkylbenzenes and the mineral oils have the highest insulating property, but they are hardly compatible with hydrogen-containing halogenocarbons such as HFC-134a as mentioned above. WO 90/12849 describes a composition comprising a hydrogen-containing halogenocarbon and a specific ester lubricant. No refrigerator oil having both high compatibility with hydrogen-containing halogenocarbons such as HFC-134a and a high insulating property has been developed prior to the present invention.

SUMMARY OF THE INVENTION

The present inventors made various intensive studies in attempts to develop refrigerator oils which can meet the aforesaid requirements and, as the result of their studies, they found that esters having specific structures have excellent compatibility with hydrogen-containing halogenocarbons such as HFC-134a, and a high electrical insulating property as well as excellent lubricity. This invention is based on this finding.

The object of this invention is to provide refrigerator oils for use with hydrogen-containing halogenocarbons refrigerants, the oils comprising as a major component (or a base oil) at least one kind of ester having a specific structure and an epoxy compound and having excellent compatibility with hydrogen-containing halogenocarbons such as HFC-134a, high electrical insulating property, high wear resistance, low hygroscopicity, and high thermal and chemical stability.

The present invention provides a refrigerator oil for use in compressors using therein a hydrogen-containing halogenocarbon as a refrigerant, consisting essentially of as a base oil at least one ester selected from the group consisting of:

[I] a pentaerythritol ester represented by the general formula (1)

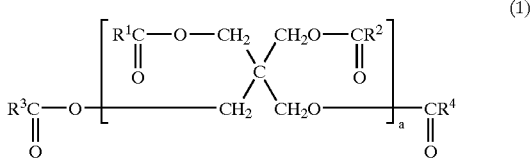  (1)

wherein $R^1$–$R^4$ may be identical with or different from each other and are each selected from the group consisting of straight-chain alkyl groups having 3 to 11 carbon atoms, branched-chain alkyl groups having 3 to 15 carbon atoms and cycloalkyl groups having 6 to 12 carbon atoms and a is an integer of 1 to 3;

[II] a polyol ester represented by the general formula (2)

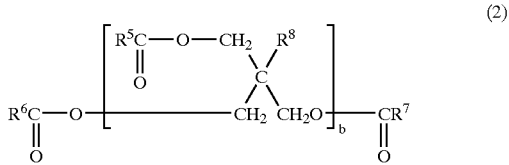  (2)

wherein $R^5$–$R^7$ may be identical with or different from each other and are each selected from the group consisting of straight-chain alkyl groups having 3 to 11 carbon atoms, branched-chain alkyl groups having 3 to 15 carbon atoms and cycloalkyl groups having 6 to 12 carbon atoms, the straight-chain alkyl groups being present in a ratio of not more than 60% of the total alkyl groups, $R^8$ is selected from the group consisting of methyl, ethyl and propyl groups, and b is an integer of 1 to 3;

[III] an ester represented by the general formula (3)

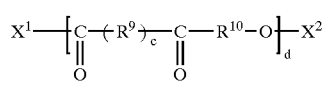  (3)

wherein $X^1$ is a group represented by the general formula —$OR^{11}$ or

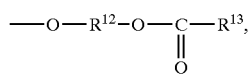

$X^2$ is a group represented by the general formula

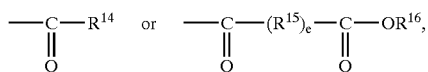

$R^9$ and $R^{15}$ are each a divalent hydrocarbon group having 1 to 8 carbon atoms, $R^{10}$ and $R^{12}$ are each a divalent saturated hydrocarbon group having 2 to 16 carbon atoms, $R^{11}$ and $R^{16}$ are each a branched-chain alkyl group having 3 to 15 carbon atoms, $R^{13}$ and $R^{14}$ are each a branched-chain alkyl group having 3 to 14 carbon atoms, c and e are each an integer of 0 or 1 and d is an integer of 0 to 30; and

[IV] a polyol ester obtained by the synthesis of, as raw materials, (a) a neopentyl type polyhydric alcohol having 5 to 6 carbon atoms and 3 to 4 hydroxyl groups, (b) a straight-chain monocarboxylic acid and/or a branched-chain monocarboxylic acid, the branched-chain monocarboxylic acid being present in a ratio of not less than 50 mol % of the total monocarboxylic acids, (c) a dicarboxylic acid: and further comprising at least one epoxy compound.

First, the pentaerythritol esters [I] will be explained in detail. In the formula (1), $R^1$–$R^4$ may be identical with, or different from, each other and are each a substituent selected from the group consisting of straight-chain alkyl groups having 3–11 carbon atoms, preferably 3–7 carbon atoms, branched-chain alkyl groups having 3–15 carbon atoms, preferably 4–11 carbon atoms and cycloalkyl groups having 6–12 carbon atoms, preferably 6–8 carbon atoms. The cycloalkyl groups in this invention may include alkylcycloalkyl groups. In addition, the ratio of the straight-chain alkyl groups to the total alkyl groups is preferably not more than 60%, more preferably not more than 50%. Further, a is an integer of 1–3. Thus, the formula(1) illustrates monopentaerythritol esters, dipentaerythritol esters and tripentaerythritol esters.

$R^1$–$R^4$ are each exemplified by n-propyl group, n-butyl group, n-pentyl group, n-hexyl group, n-heptyl group, n-octyl group, n-nonyl group, n-decyl group, n-undecyl group, iso-propyl group, iso-butyl group, iso-pentyl group, isohexyl group, iso-heptyl group, iso-octyl group, iso-nonyl group, iso-decyl group, iso-undecyl group, iso-dodecyl group, iso-tridecyl group, iso-tetradecyl group, iso-pentadecyl group, cyclohexyl group, cycloheptyl group, cyclooctyl group, cyclononyl group, cyclodecyl group, cycloundecyl group, cyclododecyl group, methylcyclohexyl group, ethylcyclohexyl group, propylcyclohexyl group, butylcyclohexyl group, pentylcyclohexyl group or hexylcyclohexyl group.

The pentaerythritol esters [I] are esters of pentaerythritol, dipentaerythritol or tripentaerythritol and a monocarboxylic acid, and are ordinarily obtained by the reaction of pentaerythritol, dipentaerythritol, tripentaerythritol or a mixture thereof with a mixture of at least one carboxylic acid having the aforementioned alkyl group.

Secondly, the polyol esters [II] will be explained in detail. In the formula (2), $R^5$–$R^7$ may be identical with, or different from, each other and are each a substituent selected from the group consisting of straight-chain alkyl groups having 3–11 carbon atoms, preferably 3–7 carbon atoms, branched-chain alkyl groups having 3–15 carbon atoms, preferably 4–11 carbon atoms and cycloalkyl groups having 6–12 carbon atoms, preferably 6–8 carbon atoms. The cycloalkyl groups in this invention may include alkylcycloalkyl groups. With respect to the above $R^5$–$R^7$, the ratio of the straight-chain alkyl groups to the total alkyl groups (including cycloalkyl groups) is not more than 60%, preferably not more than 50%. In addition, $R^8$ is a group selected from the group consisting of methyl group, ethyl group and propyl group. Further, b is an integer of 1–3. Thus, the formula (2) illustrates trimethylolethane esters, trimethylolpropane esters, trimethylolbutane esters and dimers-trimers thereof.

$R^5$–$R^7$ are each exemplified by n-propyl group, n-butyl group, n-pentyl group, n-hexyl group, n-heptyl group, n-octyl group, n-nonyl group, n-decyl group, n-undecyl group, iso-propyl group, iso-butyl group, iso-pentyl group, iso-hexyl group, iso-heptyl group, iso-octyl group, iso-nonyl group, iso-decyl group, iso-undecyl group, iso-dodecyl group, iso-tridecyl group, iso-tetradecyl group, iso-pentadecyl group, cyclohexyl group, cycloheptyl group, cyclooctyl group, cyclononyl group, cyclodecyl group, cycloundecyl group, cyclododecyl group, methylcyclohexyl group, ethylcyclohexyl group, propylcyclohexyl group, butylcyclohexyl group, pentylcyclohexyl group or hexylcyclohexyl group.

The polyol esters [II] are esters of trimethylolethane, trimethylolpropane, trimethylolbutane or a dimer or trimer thereof and a monocarboxylic acid, and are ordinarily obtained by the reaction of trimethylolethane, trimethylolpropane, trimethylolbutane, a dimer or trimer thereof or a mixture thereof with a mixture of at least one carboxylic acid having the aforementioned alkyl group.

Thirdly, the esters [III] will be explained in detail. In the formula (3), $X^1$ is a group represented by the general formula $-OR^{11}$ or

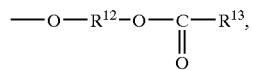

and $X^2$ is a group represented by the general formula

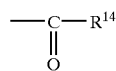

or

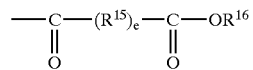

. In addition, $R^9$ and $R^{15}$ are each a divalent hydrocarbon group having 1–8 carbon atoms, preferably 1–6 carbon atoms, $R^{10}$ and $R^{12}$ are each a divalent saturated hydrocarbon group having 2–16 carbon atoms, preferably 2–9 carbon atoms, $R^{11}$ and $R^{16}$ are each an alkyl group having 1–15 carbon atoms, preferably 1–12 carbon atoms, and $R^{13}$ and $R^{14}$ are each an alkyl group having 1–14 carbon atoms, preferably 1–11 carbon atoms. Further, c and e are each an integer of 0 or 1 and d is an integer of 0–30, preferably 1–30.

$R^9$ and $R^{15}$ are each exemplified by a methylene group, ethylene group, propylene group, trimethylene group, butylene group, tetramethylene group, pentamethylene group, hexamethylene group, heptamethylene group, octamethylene group, phenylene group, other unsaturated hydrocarbon groups or the like. $R^{10}$ and $R^{12}$ are each illustrated by nonamethylene group, decamethylene group, undecamethylene group, dodecamethylene group, tridecamethylene group, tetradecamethylene group, pentadecamethylene group, hexadecamethylene group, cyclohexylene group or the like in addition to the above alkylene groups (except for methylene group). $R^{13}$ and $R^{14}$ are each concretely exemplified by straight- or branched-chain alkyl groups, such as methyl group, ethyl group, propyl group, butyl group, pentyl group, hexyl group, heptyl group, octyl group, nonyl group, decyl group, undecyl group, dodecyl group, tridecyl group or tetradecyl group. $R^{11}$ and $R^{16}$ are each illustrated by a straight- or branched-chain alkyl group, such as a pentadecyl group, in addition to any one of the above alkyl groups.

The method for producing the esters [III] is not particularly limited. For example, a mixture of the esters [III] can be produced by the esterification reaction of (i) a diol having none of ether linkages in the branched-chains thereof with (ii) a dicarboxylic acid and (iii) a monocarboxylic acid and/or (iv) a monohydric alcohol. The esters [III] are also produced by the reaction of the diol (i) with the monocarboxylic acid (iii) or the reaction of the dicarboxylic acid (ii) with the monohydric alcohol (iii).

The diols (i) used herein are those having 2–16 carbon atoms and are exemplified by alkylene glycols such as ethylene glycol, propylene glycol, butylene glycol, trimethylene glycol, tetramethylene glycol, pentamethylene glycol, hexamethylene glycol, heptamethylene glycol, octamethylene glycol, nonamethylene glycol, decamethylene glycol, neopentyl glycol, 2-ethyl-2-methyl-1,3-propanediol, 2-methyl-2-propyl-1,3-propanediol, 2,2-dimethyl-1,3-propanediol, 2-butyl-2-ethyl-1,3-propanediol, 3-methyl-1,5-pentanediol, 2,4-pentanediol, 2-methyl-2,4-pentanediol, 2-methyl-1,6-hexane, 1,4-cyclohexane dimethanol and 2,2-bis (4-hydroxycyclohexyl) propane.

The dicarboxylic acids (ii) used herein are those having 2–10 carbon atoms and are exemplified by saturated aliphatic dicarboxylic acids such as oxalic acid, malonic acid, succinic acid, glutaric acid, adipic acid, pimelic acid, suberic acid, azelaic acid, sebacic acid, methylmalonic acid, ethylmalonic acid, dimethylmalonic acid, methylsuccinic acid, 2,2-dimethylsuccinic acid, 2,3-dimethylsuccinic acid, 2-ethyl-2-methylsuccinic acid, 2-methylglutaric acid, 3-methylglutaric acid, 3,3-dimethylglutaric acid and 3-methyladipic acid; unsaturated aliphatic dicarboxylic acids such as maleic acid, fumaric acid, itaconic acid, citraconic acid and mesaconic acid; and aromatic dicarboxylic acids such as phthalic acid, isophthalic acid and terephthalic acid.

The monocarboxylic acids (iii) used herein are those having 2–15 carbon atoms and are exemplified by acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, 3-methylbutanoic acid, 2-methylbutanoic acid, 2-ethylhexanoic acid, 2,4-dimethylpentanoic acid, 3,3,5-trimethylhexanoic acid and benzoic acid.

The monohydric alcohols (iv) used herein are those having 1–15 carbon atoms and are exemplified by methanol, ethanol, propanol, butanol, pentanol, hexanol, heptanol, octanol, nonanol, decanol, unedecanol, dodecanol, tridecanol, tetradecanol, pentadecanol, isopropanol, isobutanol, 2-methyl-1-butanol, 2,2-dimethyl-1-propanol, 3,3-dimethyl-1-butanol, 2-methyl-1-pentanol, 3-methyl-1-pentanol, 2,4,4-trimethyl-1-pentanol, 2,2,4-trimethyl-1-pentanol, 2-ethyl-4-methyl-1-pentanol and 2-ethyl-1-hexanol.

The molecular weight of the ester [III] is not particularly limited, but the number average molecular weight of the ester [III] is in the range of preferably 200–3000, more preferably 300–2000, to improve the compressor in sealability.

Fourthly, the polyol ester [IV] will be explained in detail.

The neopentyl type polyhydric alcohols (a) having 5–6 carbon atoms and 3–4 hydroxyl groups are illustrated by trimethylolethane, trimethylolpropane and pentaerythritol.

The monocarboxylic acids (b) preferably used herein are those having 2–15 carbon atoms and are exemplified by acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid and pentadecanoic acid.

These carboxylic acids may be either straight-chain or branched-chain ones, but it is preferable to use the latter having a branched-chain structure in an amount of not less than 50 mol %, preferably not less than 60 mol %.

The dicarboxylic acids (c) used herein are those having 2–10 carbon atoms and are exemplified by saturated aliphatic dicarboxylic acids such as oxalic acid, malonic acid, succinic acid, glutaric acid, adipic acid, pimelic acid, suberic acid, azelaic acid, sebacic acid, methylmalonic acid, ethylmalonic acid, dimethylmalonic acid, methylsuccinic acid, 2,2-dimethylsuccinic acid, 2,3-dimethylsuccinic acid, 2-ethyl-2-methylsuccinic acid, 2-methylglutaric acid, 3-methylglutaric acid and 3-methyladipic acid; unsaturated aliphatic dicarboxylic acids such as maleic acid, fumaric acid, itaconic acid, citraconic acid and mesaconic acid; and aromatic dicarboxylic acids such as phthalic acid, terephthalic acid and isophthalic acid.

The esters [IV] are produced by the esterification reaction of the aforesaid component (a) with the component (b) and the component (c) under ordinary esterification conditions, for example, in the presence of an acid catalyst such as sulfuric acid and at an temperature of 100–180° C.

The chemical structure of the ester [IV] according to the present invention is illustrated by the following general formula (6)

(6)

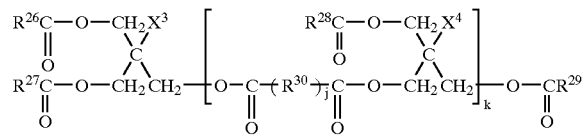

wherein $X^3$ and $X^4$ may be identical with, or different from, each other and are each an alkyl group having 1–4 carbon atoms or a group represented by the general formula

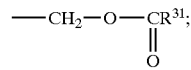

; $R^{26}$–$R^{29}$ and $R^{31}$ may be identical with, or different from each other and are each an alkyl group having 4–15 carbon atoms; $R^{30}$ is an alkylene group having 1–8 carbon atoms; j is an integer of 0 or 1; and k is an integer of 1–5.

The molecular weight of the polyol ester [IV] is not particularly limited, but the number average molecular weight of the ester [IV] is in the range of preferably 200–3000, more preferably 300–2000, to improve the compressor in sealability.

The products obtained by the methods as mentioned above may be refined to remove the by-products and/or unreacted reactants, but the by-products and/or unreacted reactants may be present in small amounts in the refrigerator oils of the present invention as far as they do not impair the excellent performances thereof.

In the preparation of the refrigerator oils of the present invention, the esters [I]–[IV] mentioned above may be used singly, or jointly as a mixture of at least two kinds of the esters.

The kinematic viscosities of the esters according to the present invention are in the range of preferably 2–150 cSt, more preferably 5–100 cSt at 100° C.

The refrigerator oil of the present invention may comprise as the only base oil at least one member selected from the above esters [I]–[IV] and, as required, it may additionally comprise other base oils for refrigerator oils. Among the other base oils, preferable ones are illustrated as follows:

a polyoxyalkylene glycol or an ether thereof represented by the general formula (4)

wherein $R^{17}$ and $R^{18}$ are each a hydrogen atom or an alkyl group having 1–18 carbon atoms, $R^{19}$ is an alkylene group having 2–4 carbon atoms and f is an integer of 5–70, and a polyoxyalkylene glycol glycerol ether represented by the general formula (5)

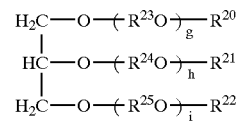

wherein $R^{20}$–$R^{22}$ are each a hydrogen atom or an alkyl group having 1–18 carbon atoms, $R^{23}$–$R^{25}$ are each an alkylene group having 2–4 carbon atoms and g–i are each an integer of 5–7.

These conventional oils represented by the formulae (4) and (5) may be used singly or jointly for adding to the refrigerator oil of this invention. Further, the refrigerator oil of this invention may be incorporated with paraffinic mineral oils, naphthenic mineral oils, polyα-olefins, alkylbenzenes and the like, but, in this case, the resulting mixed oil will be lowered in compatibility with hydrogen-containing halogenocarbons.

The amount of these conventional base oils so incorporated is not particularly limited as far as the excellent performances of the refrigerator oil of this invention are not impaired, but the esters [I]–[IV] should be present in the resulting mixed oil in a ratio of usually more than 50% by weight, preferably not less than 70% by weight of the total amount of the mixed oil.

To further improve the refrigerator oil of the present invention in thermal stability and chemical stability, it is incorporated with at least an epoxy compound. The epoxy compound used herein is preferably selected from the group consisting of phenylglycidyl ether epoxy compounds, alkylglycidyl ether epoxy compounds, glycidyl ester epoxy compounds, aryloxirane compounds, alkyloxirane compounds, alicyclic epoxy compounds, epoxidized fatty acid monoesters and epoxidized vegetable oils.

The said phenylglycidyl ether epoxy compounds used herein include phenylglycidyl ether and derivatives thereof such as alkylphenylglycidyl ethers. The said alkylphenylglycidyl ethers are those having 1 to 3 alkyl groups having 1 to 13 carbon atoms, among which are preferred those having an alkyl group having 4 to 10 carbon atoms, such as n-butylphenylglycidyl ether, i-butylphenylglycidyl ether, sec-butylphenylglycidyl ether, tert-butylphenylglycidyl ether, pentylphenylglycidyl ether, hexylphenylglycidyl ether, heptylphenylglycidyl ether, octylphenylglycidyl ether, nonylphenylglycidyl ether and decylphenylglycidyl ether.

The alkylglycidyl ether epoxy compounds include decylglycidyl ether, undecylglycidyl ether, dodecylglycidyl ether, tridecylglycidyl ether, tetradecylglycidyl ether, 2-ethylhexylglycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ethers and polyalkylene glycol diglycidyl ethers.

The glycidyl ester epoxy compounds include phenylglycidyl esters, alkylglycidyl esters and alkenylglycidyl esters with glycidyl 2,2-dimethyl octanoate, glycidyl benzoate, glycidyl acrylate, glycidyl methacrylate and the like being preferred.

The aryloxirane compounds include 1,2-epoxystyrene and alkyl-1,2-epoxystyrene.

The alkyloxirane compounds include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane and 1,2-epoxyeicosane.

The alicyclic epoxy compounds include 1,2-epoxycyclohexane, 1,2-epoxycyclopentane, 3,4-epoxycyclohexylmethyl-3,4-epoxycyclohexane carboxylate, bis (3,4-epoxycyclohexylmethyl) adipate, exo-2,3-epoxynorbornane, bis (3,4-epoxy-6-methylcyclohexylmethyl) adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane and 4-epoxyethyl-1,2-epoxycyclohexane.

The epoxidized fatty acid monoesters include esters of an epoxidized fatty acid having 12 to 20 carbon atoms and an alcohol having 1 to 8 carbon atoms, phenol or an alkylphenol. In particular, butyl, hexyl, benzyl, cyclohexyl, methoxyethyl, octyl, phenyl or butylphenyl esters of epoxidized stearic acid may preferably be used.

The epoxidized vegetable oils include epoxidized compounds of vegetable oils such as soybean oil, linseed oil and cottonseed oil.

Among these epoxy compounds, the preferable ones include phenylglycidyl ether epoxy compounds, alkylglycidyl ether type epoxy compounds, glycidyl ester type epoxy compounds and alicyclic epoxy compounds.

It is desirable that these epoxy compounds be incorporated in the refrigerator oil of the present invention in a ratio of 0.1–5.0% by weight, preferably 0.2–2.0% by weight, of the total amount of the refrigerator oil.

The refrigerator oil composition according to this invention may be incorporated further with at least one kind of a phosphorus compound selected from the group consisting of phosphoric esters, acid phosphoric esters, amine salts of acid phosphoric esters, chlorinated phosphoric esters and phosphorous esters, to improve the oil composition in wear resistance and load resistance. These phosphorus compounds are esters of phosphoric acid or phosphorous acid and an alkanol or a polyether type alcohol, or derivatives of the esters. The phosphoric esters are exemplified by tributyl phosphate, triphenyl phosphate and tricresyl phosphate. The acid phosphoric esters are exemplified by ditetradecyl acid phosphate, dipentadecyl acid phosphate, dihexadecyl acid phosphate, diheptadecyl acid phosphate and dioctadecyl acid phosphate. The amine salts of acid phosphoric esters are exemplified by salts of the above acid phosphoric esters and amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine and trioctylamine. The chlorinated phosphoric esters are exemplified by tris-dichloropropyl phosphate, tris.chloroethyl phosphate, polyoxyalkylene bis[di(chloroalkyl)] phosphate and tris.chlorophenyl phosphate. The phosphorous esters are exemplified by dibutyl phosphite, tributyl phosphite, dipentyl phosphite, tripentyl phosphite, dihexyl phosphite, trihexyl phosphite, diheptyl phosphite, triheptyl phosphite, dioctyl phosphite, trioctyl phosphite, dinonyl phosphite, didecyl phosphite, diundecyl phosphite, triundecyl phosphite, didodecyl phosphite, tridodecyl phosphite, diphenyl phosphite, triphenyl phosphite, dicresyl phosphite, tricresyl phosphite and mixtures thereof. These phosphorus compounds may be added to the refrigerator oil in a ratio of 0.1–5.0% by weight, preferably 0.2–2.0% by weight, of the total amount of the refrigerator oil.

Of course, both of the aforementioned phosphorus compounds and epoxy compounds may be used jointly.

To further enhance the refrigerator oil of this invention in performances, the refrigerator oil may be incorporated, as required, with heretofore known additives for a refrigerator oil, which include phenol-type antioxidants such as di-tert.-butyl-p-cresol and bisphenol A; amine-type antioxidants such as phenyl-α-naphthylamine and N,N-di(2-naphthyl)-p-phenylenediamine; wear resistant additives such as zinc dithiophosphate; extreme pressure agents such as chlorinated paraffin and sulfur compounds; oiliness improvers such as fatty acids; antifoaming agents such as silicone-type ones; and metal inactivators such as benzotriazole. These additives may be used singly or jointly. The total amount of these additives added is ordinarily not more than 10% by weight, preferably not more than 5% by weight, of the total amount of the refrigerator oil.

The refrigerator oils of this invention comprising at least one of the esters [I]–[IV] as the base oil should have such viscosity and pour point as those which are normally suitable for an ordinary refrigerator oil, but they should desirably have a pour point of not higher than −10° C., preferably −20° C. to −80° C., to prevent them from solidification at a low temperature. Further, they should desirably have a kinematic viscosity of not less than 2cSt, preferably not less than 3cSt at 100° C., to keep the sealability of the compressor when used, while they should desirably have a kinematic viscosity of not more than 150cSt, preferably not more than 100 cSt at 100° C., in view of their fluidity at a low temperature and the efficiency of heat exchange in the evaporator when used.

The refrigerants which may be used in refrigerators in which the lubricating oils (refrigerator oils) of the present invention are suitably used, include hydrogen-containing halogenocarbons such as alkane fluorides having 1–3 carbon atoms, preferably 1–2 carbon atoms and/or alkane chloride fluoride having 1–3 carbon atoms, preferably 1–2 carbon atoms. The said hydrogen-containing halogenocarbons are exemplified by HFCs (chlorine-free type halogenocarbons) such as difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a) and 1,1-difluoroethane (HFC-152a); HCFCs (chlorine-containing type halogenocarbons) such as monochlorodifluoromethane (HCFC-22), 1-chloro-1,1-difluoroethane (HCFC-142b), dichlorotrifluoroethane (HCFC-123) and monochlorotetrafluoroethane (HCFC-124); and mixtures thereof. Among these hydrogen-containing halogenocarbons, the chlorine-free type halogenocarbons such as HFC-32, HFC-23, HFC-125, HFC-134, HFC-134a and HFC-152a, are preferable in view of the environmental problems. The refrigerant used may suitably be selected from these halogenocarbons mentioned above depending on the purpose for which the resulting refrigerant is used as well as the properties which are desirable for the resulting refrigerant. The preferable refrigerants are exemplified by HFC-134a; a mixture of HFC-134a (60–80 wt %) and HFC-32 (40–20 wt %); a mixture of HFC-32 (50–70 wt %) and HFC-125 (50–30 wt %); a mixture of HFC-134a (60 wt %), HFC-32 (30 wt %) and HFC-125 (10 wt %); a mixture of HFC-134a (52 wt %), HFC-32 (23 wt %) and HFC-125 (25 wt %); and a mixture of HFC-143a (52 wt %), HFC-125 (44 wt %) and HFC-134a (4 wt %).

When the refrigerator oil of the present invention is used in a refrigerator, it is usually present in the form of a fluid composition for the refrigerator, which is a mixture of the refrigerator oil and a chlorine-free type halogenocarbon such as an alkane fluoride and/or an alkane chloride fluoride as mentioned above.

The present invention also relates to a fluid composition for a refrigerator, which comprises a chlorine-free type halogenocarbon refrigerant and a refrigerator oil according to the present invention.

The mixing ratio of the refrigerator oil and the refrigerant in the resulting composition is not particularly limited, but the refrigerator oil is usually comprised in an amount of 1–500 parts by weight, preferably in an amount of 2–400 parts by weight, based on 100 parts by weight of the refrigerant.

The refrigerator oils of the present invention are excellent in compatibility with the hydrogen-containing halogenocarbons as compared with the heretofore known refrigerator oils. Further, the refrigerator oils of the present invention are excellent because they have not only high compatibility with the hydrogen-containing halogenocarbons and high electrical insulating property but also high lubricity, low hygroscopicity and high thermal and chemical stability.

The refrigerator oils of the present invention may particularly preferably be used in refrigerators, air-conditioners, dehumidifiers, cold-storage chests, freezers, freeze and refrigeration warehouses, automatic vending machines, showcases, cooling units in chemical plants, and the like which have a reciprocating or rotary compressor. Further, the above refrigerator oils may also preferably be used in refrigerators having a centrifugal compressor.

This invention will be better understood by the following Examples and Comparative Examples.

EXAMPLES 1–69 AND COMPARATIVE EXAMPLES 1–70

First, base oils according to this invention (Base oils 1–23 and 30) and comparative base oils of conventional types (Base oils 24–29 and 31–49), which are used in the Examples and Comparative Examples, respectively, are illustrated as follows:

[Base oil 1] A tetraester of pentaerythritol (1 mol) and 2-ethylhexanoic acid (4 mol):

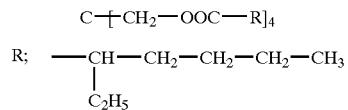

[Base oil 2] A tetraester of pentaerythritol (1 mol) and 3,5,5-trimethylhexanoic acid (4 mol):

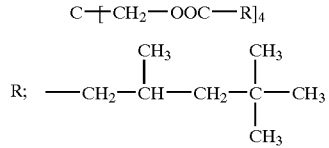

[Base oil 3] A tetraester of pentaerythritol (1 mol), 2-ethylhexanoic acid (2 mol) and 3,5,5-trimethylhexanoic acid (2 mol)

[Base oil 4] A hexaester of dipentaerythritol (1 mol), n-hexanoic acid (3 mol) and 2,4-dimethylpentanoic acid (3 mol):

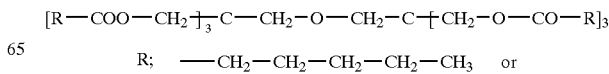

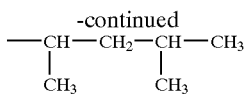

[Base oil 5] A hexaester of dipentaerythritol (1 mol) and 3,5,5-trimethylhexanoic acid (6 mol):

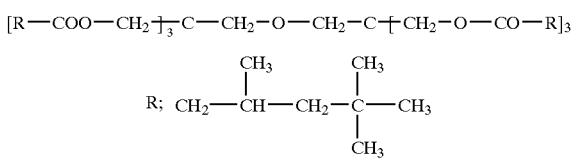

[Base oil 6] A mixture of 50 parts by weight of the same ester as in Base oil 1 and 50 parts by weight of the same ester as in Base oil 5

[Base oil 7] A mixture of 30 parts by weight of the same ester as in Base oil 2, 40 parts by weight of the same ester as in Base oil 5 and 30 parts by weight of the following octaester of tripentaerythritol (1 mol), 3-methylbutanoic acid (4 mol) and 3-methylpentanoic acid (4 mol):

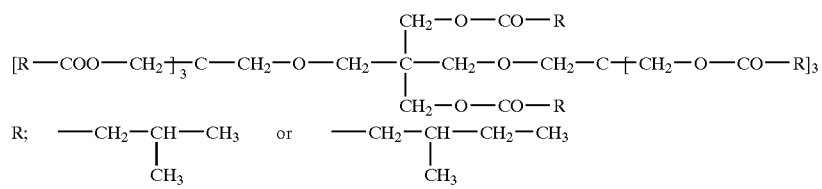

[Base oil 8] A triester of trimethylolpropane (1 mol) and 2-ethylhexanoic acid (3 mol):

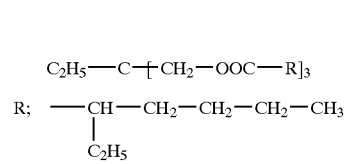

[Base oil 9] A triester of trimethylolpropane (1 mol) and 3,5,5-trimethylhexanoic acid (3 mol):

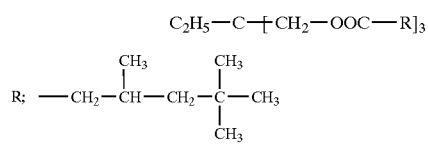

[Base oil 10] A triester of trimethylolpropane (1 mol), 2-ethylhexanoic acid (1.5 mol) and 3,5,5-trimethylhexanoic acid (1.5 mol)

[Base oil 11] A tetraester of di-(trimethylolpropane) (1 mol), n-hexanoic acid (2 mol) and 2,4-dimethylpentanoic acid (2 mol):

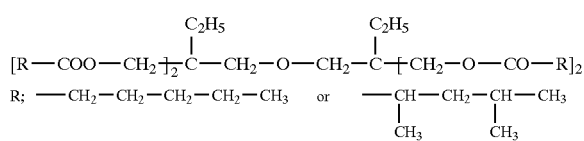

[Base oil 12] A tetraester of di-(trimethylolpropane) (1 mol) and 3,5,5-trimethylhexanoic acid (4 mol):

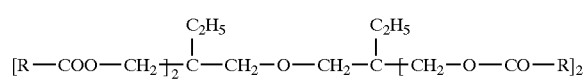

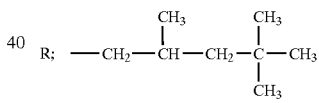

[Base oil 13] A mixture of 50 parts by weight of the same ester as in Base oil 8 and 50 parts by weight of the same ester as in Base oil 12

[Base oil 14] A mixture of 30 parts by weight of the same ester as in Base oil 9, 40 parts by weight of the same ester as in Base oil 12 and 30 parts by weight of the following octaester of tripentaerythritol (1 mol), 3-methylbutanoic acid (4 mol) and 3-methylpentanoic acid (4 mol):

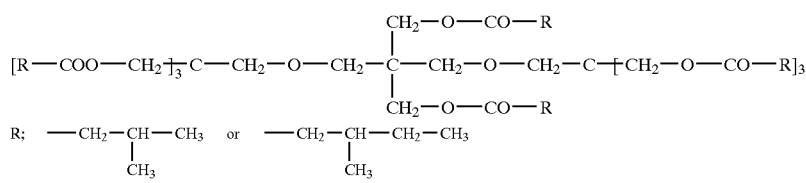

[Base oil 15] A diester of adipic acid and 2-ethyl-1-hexanol:

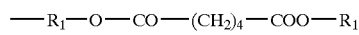

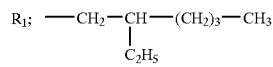

[Base oil 16] A diester of 3-methyl-1,5-pentanediol and 3,5,5-trimethylhexanoic acid:

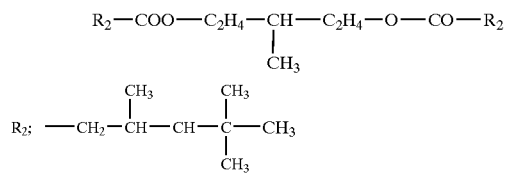

[Base oil 17] A complex ester having an average molecular weight of about 500 of 3-methyl-1,5-pentanediol, adipic acid and 3,5,5-trimethylhexanoic acid:

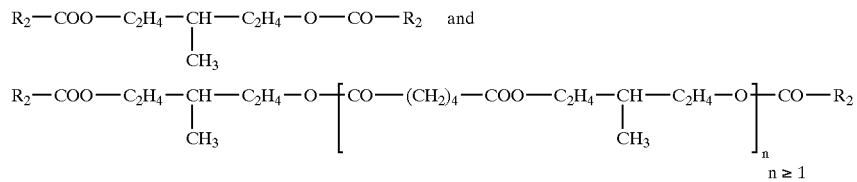

$R^2$; the same as in Base oil 16

[Base oil 18] A complex ester having the same composition as that in Base oil 17 except for having an average molecular weight of about 700

[Base oil 19] A complex ester having an average molecular weight of about 520 of 3-methyl-1,5-pentanediol, adipic acid and 2-ethyl-1-hexanol:

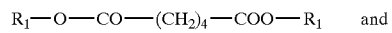

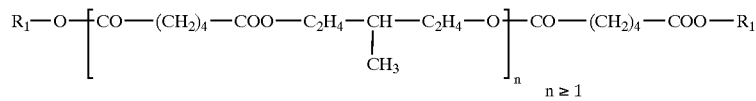

[Base oil 20] A complex ester having the same composition as that in Base oil 19 except for having an average molecular weight of about 750

[Base oil 21] A mixture of the same complex ester as in Base oil 17 and 1.0 wt. % of a phosphoric ester type wear inhibitor

[Base oil 22] An ester having an average molecular weight of 690 and a kinematic viscosity at 100° C. of 9.6 cSt, obtained by the reaction of 2 moles of trimethylolpropane with 1 mole of succinic acid, 1 mole of glutaric acid, 2 moles of iso-pentanoic acid and 2 moles of iso-hexanoic acid

[Base oil 23] An ester having an average molecular weight of 880 and a kinematic viscosity at 100° C. of 12.7 cSt, obtained by the reaction of 2 moles of pentaerythritol with 1 mole of succinic acid, 1 mole of glutaric acid, 3 moles of iso-pentanoic acid and 3 moles of iso-hexanoic acid

[Base oil 24] A naphthenic mineral oil

[Base oil 25] A branched-chain type alkylbenzene (average molecular weight: about 300)

[Base oil 26] Polyoxypropylene glycol monobutyl ether (average molecular weight: about 500)

[Base oil 27] Polyoxypropylene glycol monobutyl ether (average molecular weight: about 1000)

[Base oil 28] Polyoxypropylene glycol (average molecular weight: about 700)

[Base oil 29] Polyoxypropylene glycol (average molecular weight: about 2000)

[Base oil 30] A tetraester of pentaerythritol (1 mol) and n-nonanoic acid (4 mol)

[Base oil 31] A tetraester of pentaerythritol (1 mol) and coconut oil

[Base oil 32] A triester of trimethylolpropane (1 mol) and n-nonanoic acid (3 mol)

[Base oil 33] A triester of trimethylolpropane (1 mol) and coconut oil

[Base oil 34] Polyoxyethyleneoxypropylene glycol mono n-butyl ether (number–average molecular weight=670, kinematic viscosity at 100° C.=7.1 mm²/s, weight ratio of oxyethylene groups to oxypropylene groups in polyoxyalkylene chain=1:1)

[Base oil 35] Propylene glycol derivative of polyoxypropylene glycol mono methyl ether (number-average molecular weight=1100, kinematic viscosity at 100° C.=11.3 mm²/s):

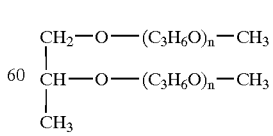

[Base oil 36] Glycerol derivative of polyoxypropylene glycol mono methyl ether (number-average molecular weight=1300, kinematic viscosity at 100° C.=12.8 mm²/s)

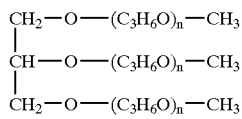

[Base oil 37] Mixture of base oil 1 and base oil 27 (weight ratio of base oil 1 to base oil 27=70:30)

[Base oil 38] Mixture of base oil 1 and base oil 27 (weight ratio of base oil 1 to base oil 27=50:50)

[Base oil 39] Mixture of base oil 1 and base oil 34 (weight ratio of base oil 1 to base oil 34=30:70)

[Base oil 40] Mixture of base oil 1 and base oil 36 (weight ratio of base oil 1 to base oil 36=70:30)

[Base oil 41] Mixture of base oil 2 and base oil 36 (weight ratio of base oil 2 to base oil 36=50:50)

[Base oil 42] Mixture of base oil 3 and base oil 36 (weight ratio of base oil 3 to base oil 36=30:70)

[Base oil 43] Mixture of base oil 4 and base oil 27 (weight ratio of base oil 4 to base oil 27=50:50)

[Base oil 44] Mixture of base oil 5 and base oil 27 (weight ratio of base oil 5 to base oil 27=50:50)

[Base oil 45] Mixture of base oil 6 and base oil 27 (weight ratio of base oil 6 to base oil 27=70:30)

[Base oil 46] Mixture of base oil 7 and base oil 27 (weight ratio of base oil 7 to base oil 27=30:70)

[Base oil 47] Mixture of base oil 1 and base oil 27 (weight ratio of base oil 1 to base oil 27=95:5)

[Base oil 48] Mixture of base oil 1 and base oil 34 (weight ratio of base oil 1 to base oil 34=95:5)

[Base oil 49] Mixture of base oil 30 and base oil 27 (weight ratio of base oil 30 to base oil 27=95:5)

The refrigerator oils of Examples 1–69 according to the present invention each of which has a composition indicated in the following Table 1 were prepared and then evaluated for their performance specifically their miscibility with HFC-134a, insulating property, wear resistance, hygroscopicity and thermal and chemical stability by the following respective test methods. The results thus obtained are indicated in Table 1.

For comparison, the mineral oil (Comparative Example 1), the alkylbenzene (Comparative Example 2), the polypropylene glycol monoalkyl ethers and derivatives thereof (Comparative Examples 3, 4, 34–45, 62 and 63), the polypropylene glycols (Comparative Examples 5 and 6), the straight-chain fatty acid esters of polyol alcohols (Comparative Examples 8–10) which are free from epoxy compounds and have heretofore been used as refrigerator oils, mixed oils of the polypropylene glycol monoalkyl ethers or derivatives thereof with the esters of the present invention (Comparative Examples 46–61 and 64–70), mixed oils of the tetraester of pentaerythritol, as well as Base oils 1–23 (Comparative Examples 11–33) which are free from epoxy compounds, were evaluated for their performances in the same manner as in Examples 1–72. The results thus obtained are indicated in Table 2.

(Miscibility with HFC-134a)

0.2 g of the test oil of each of the Examples (Examples 1–23 and 67–69) and the Comparative Examples (Comparative Examples 1–33 and 70) and 1.8 g of the refrigerant (HFC-134a) as well as 0.06 g of the test oil of each of the Examples (Examples 1–23 and 67–69) and the Comparative Examples (Comparative Examples 11–33 and 70) and 1.94 g of the refrigerant (HFC-134a) were sealed in a glass tube having an inner diameter of 6 mm and a length of 220 mm. This glass tube was then placed in a thermostat maintained at a predetermined low temperature or high temperature to observe whether the refrigerant and the test oil were miscible with each other, separated from each other or made white-turbid.

(Insulating Property)

The test oils were each measured for specific volume resistivity at 25° C. in accordance with JIS C 2101.

(FALEX Wear Test)

The test oils were each applied to a test journal for measuring the amount of the test journal worn by having the journal run in at a test oil temperature of 100° C. under a load of 150 lb for 1 minute and then running it under a load of 250 lb for 2 hours in accordance with ASTM D 2670.

(Hygroscopicity)

Thirty grams (30 g) of each of the test oils were placed in a 300-ml beaker, allowed to stand for 7 days in an air-conditioned bath maintained at a temperature of 30° C. and a humidity of 60% and then measured for water content by the Karl-Fischer method.

(Thermal and Chemical Stability)

Thermal and chemical stabilities of the test oils were evaluated by the following sealed tube test with HFC-134a in accordance with JIS K 2211 4.9.

An equi-volume mixture of each of the test oils and the refrigerant (HFC-134a) was sealed, together with copper, iron and aluminum catalysts, in a glass tube and then heated to 250° C. for 168 hours to observe discoloration of the test oil and surface states of the catalysts and determine the degree of discoloration. The degree of discoloration of the test oil was classified into 9 grades ranging from 0 (no discoloration) to 8 (black-brown color).

Fifty grams (50 g) of each of the test oils (Examples 24–66 and Comparative Examples 34–69) indicated in the Tables were placed in a 100-ml beaker, and then allowed to stand for 168 hours in an air-conditioned bath maintained at a temperature of 25° C. and a relative humidity of 80%.

Next, an equi-volume mixture of each of these test oils and the refrigerant (HFC-134a) was sealed, together with copper, iron and aluminum catalysts, in a glass tube and then heated to 175° C. for 168 hours to observe whether the state of the test oil has been changed or not.

TABLE 1

| | | Epoxy compounds* | | TCP*** | | DBPC**** | | Kinematic viscosity @ 100° C. | Miscibile Temp. Range with HFC-134a (° C.) | | | Resistivity @ 25° C. | Falex test Amount of journal worn | Hygroscopicity 30° C., 60% | Oil color | Sealed tube test | | | | Appearance of test oil |
| | Base oils | | | | | | | | Amount of HFC-134a (90 wt %) | Amount of HFC-134a (97 wt %) | | | | | | Catalyst | | | | |
| Examples / Comparative Examples | | Kind | Amount (In wt %) | | Amount (In wt %) | | Amount (In wt %) | (mm²/s) | | | | (Ωcm) | (mg) | (%) | | Cu | Fe | Al | | |
|---|---|---|---|---|---|---|---|---|---|---|---|---|---|---|---|---|---|---|---|---|
| Example 1 | 1 | PGE | 0.5 | none | none | none | none | 6.2 | −27–CT** | | −45–CT** | 4.2 × 10¹⁴ | 26 | 0.19 | 1 | No change | No change | No change | | — |
| Example 2 | 2 | s-BuPGE | 0.5 | none | none | none | none | 11.5 | −32–CT** | | −60–CT** | 3.8 × 10¹⁴ | 25 | 0.20 | 1 | No change | No change | No change | | — |
| Example 3 | 3 | t-BuPGE | 0.5 | none | none | none | none | 8.1 | −28–CT** | | −45–CT** | 3.9 × 10¹⁴ | 26 | 0.18 | 1 | No change | No change | No change | | — |
| Example 4 | 4 | DODECYLGE | 0.5 | none | none | none | none | 10.0 | <−70–CT** | | <−70–CT** | 2.9 × 10¹⁴ | 21 | 0.18 | 1 | No change | No change | No change | | — |
| Example 5 | 5 | DECYLGEs | 0.5 | none | none | none | none | 28.2 | −7–75 | | −18–90 | 3.0 × 10¹⁴ | 19 | 0.16 | 1 | No change | No change | No change | | — |
| Example 6 | 6 | EPCH | 0.5 | none | none | none | none | 11.8 | −25–90 | | −36–CT** | 3.1 × 10¹⁴ | 21 | 0.16 | 1 | No change | No change | No change | | — |
| Example 7 | 7 | EP.DODEC. | 0.5 | none | none | none | none | 32.3 | −5–86 | | <−70–CT** | 2.4 × 10¹⁴ | 19 | 0.12 | 1 | No change | No change | No change | | — |
| Example 8 | 8 | PGE | 1.0 | none | none | none | none | 3.7 | −35–CT** | | <−70–CT** | 4.5 × 10¹⁴ | 27 | 0.21 | 1 | No change | No change | No change | | — |
| Example 9 | 9 | s-BuPGE | 1.0 | none | none | none | none | 9.4 | −45–CT** | | <−70–CT** | 4.0 × 10¹⁴ | 27 | 0.20 | 1 | No change | No change | No change | | — |
| Example 10 | 10 | t-BuPGE | 1.0 | none | none | none | none | 7.1 | −37–CT** | | <−70–CT** | 4.1 × 10¹⁴ | 25 | 0.22 | 1 | No change | No change | No change | | — |
| Example 11 | 11 | DODECYLGE | 1.0 | none | none | none | none | 9.0 | <−70–CT** | | −25–CT** | 2.7 × 10¹⁴ | 23 | 0.17 | 1 | No change | No change | No change | | — |
| Example 12 | 12 | DECYLGEs | 1.0 | none | none | none | none | 22.0 | −11–75 | | −38–17 | 2.8 × 10¹⁴ | 20 | 0.14 | 1 | No change | No change | No change | | — |
| Example 13 | 13 | EPCH | 1.0 | none | none | none | none | 9.7 | −20–0 | | −21–CT** | 3.1 × 10¹⁴ | 25 | 0.15 | 1 | No change | No change | No change | | — |
| Example 14 | 14 | EP.DODEC. | 1.0 | none | none | none | none | 31.8 | −7–88 | | −19–CT** | 2.7 × 10¹⁴ | 20 | 0.12 | 1 | No change | No change | No change | | — |
| Example 15 | 15 | EP.SOY. | 1.0 | none | none | none | none | 2.3 | −24–CT** | | −38–CT** | 4.0 × 10¹⁴ | 23 | 0.22 | 1 | No change | No change | No change | | — |
| Example 16 | 16 | EP.Si.B | 1.0 | none | none | none | none | 3.0 | −30–CT** | | −54–CT** | 3.9 × 10¹⁴ | 20 | 0.21 | 1 | No change | No change | No change | | — |
| Example 17 | 17 | PGE | 2.0 | none | none | none | none | 5.3 | −55–CT** | | −60–CT** | 2.4 × 10¹⁴ | 16 | 0.16 | 1 | No change | No change | No change | | — |
| Example 18 | 18 | s-BuPGE | 2.0 | none | none | none | none | 10.1 | −34–95 | | <−70–CT** | 1.4 × 10¹⁴ | 11 | 0.11 | 1 | No change | No change | No change | | — |
| Example 19 | 19 | t-BuPGE | 2.0 | none | none | none | none | 6.0 | −47–CT** | | −56–CT** | 2.4 × 10¹⁴ | 11 | 0.17 | 1 | No change | No change | No change | | — |
| Example 20 | 20 | DODECYLGE | 2.0 | none | none | none | none | 11.4 | −32–92 | | <−70–CT** | 1.1 × 10¹⁴ | 10 | 0.11 | 1 | No change | No change | No change | | — |
| Example 21 | 21 | DECYLGEs | 2.0 | none | none | none | none | 5.3 | −55–CT** | | −70–CT** | 2.5 × 10¹⁴ | 3 | 0.16 | 0 | No change | No change | No change | | — |
| Example 22 | 22 | EPCH | 2.0 | none | none | none | none | 9.4 | <−35–76 | | <−50–CT** | 2.9 × 10¹⁴ | 19 | 0.20 | 1 | No change | No change | No change | | — |
| Example 23 | 23 | EP.DODEC. | 2.0 | none | none | none | none | 12.5 | <−30–68 | | <−50–CT** | 1.4 × 10¹⁴ | 16 | 0.12 | 1 | No change | No change | No change | | — |
| Example 24 | 1 | PGE | 3.0 | none | none | none | none | 6.0 | | | | 4.2 × 10¹⁴ | — | 0.19 | — | — | — | — | No change |
| Example 25 | 2 | s-BuPGE | 3.0 | none | none | none | none | 11.3 | | | | 3.8 × 10¹⁴ | — | 0.20 | — | — | — | — | No change |
| Example 26 | 3 | t-BuPGE | 3.0 | none | none | none | none | 7.9 | | | | 3.9 × 10¹⁴ | — | 0.18 | — | — | — | — | No change |
| Example 27 | 4 | DODECYLGE | 3.0 | none | none | none | none | 10.0 | | | | 2.9 × 10¹⁴ | — | 0.18 | — | — | — | — | No change |
| Example 28 | 5 | DECYLGEs | 3.0 | none | none | none | none | 28.0 | | | | 3.0 × 10¹⁴ | — | 0.16 | — | — | — | — | No change |
| Example 29 | 6 | EPCH | 3.0 | none | none | none | none | 11.6 | | | | 3.1 × 10¹⁴ | — | 0.16 | — | — | — | — | No change |
| Example 30 | 7 | EP.DODEC. | 3.0 | none | none | none | none | 32.1 | | | | 2.4 × 10¹⁴ | — | 0.12 | — | — | — | — | No change |
| Example 31 | 8 | PGE | 3.0 | none | none | none | none | 3.5 | | | | 4.5 × 10¹⁴ | — | 0.21 | — | — | — | — | No change |
| Example 32 | 9 | s-BuPGE | 3.0 | none | none | none | none | 9.2 | | | | 4.0 × 10¹⁴ | — | 0.20 | — | — | — | — | No change |
| Example 33 | 10 | t-BuPGE | 3.0 | none | none | none | none | 6.9 | | | | 4.1 × 10¹⁴ | — | 0.22 | — | — | — | — | No change |
| Example 34 | 11 | DODECYLGE | 3.0 | none | none | none | none | 8.8 | | | | 2.7 × 10¹⁴ | — | 0.17 | — | — | — | — | No change |
| Example 35 | 12 | DECYLGEs | 3.0 | none | none | none | none | 21.8 | | | | 2.8 × 10¹⁴ | — | 0.14 | — | — | — | — | No change |
| Example 36 | 13 | EPCH | 3.0 | none | none | none | none | 9.5 | | | | 3.1 × 10¹⁴ | — | 0.15 | — | — | — | — | No change |
| Example 37 | 14 | EP.DODEC. | 3.0 | none | none | none | none | 31.6 | | | | 2.7 × 10¹⁴ | — | 0.12 | — | — | — | — | No change |
| Example 38 | 15 | EP.SOY. | 3.0 | none | none | none | none | 2.1 | | | | 4.0 × 10¹⁴ | — | 0.22 | — | — | — | — | No change |
| Example 39 | 16 | EP.Si.B | 3.0 | none | none | none | none | 2.9 | | | | 3.9 × 10¹⁴ | — | 0.21 | — | — | — | — | No change |
| Example 40 | 17 | PGE | 3.0 | none | none | none | none | 5.3 | | | | 2.4 × 10¹⁴ | — | 0.16 | — | — | — | — | No change |
| Example 41 | 18 | s-BuPGE | 3.0 | none | none | none | none | 10.1 | | | | 1.4 × 10¹⁴ | — | 0.11 | — | — | — | — | No change |
| Example 42 | 19 | t-BuPGE | 3.0 | none | none | none | none | 6.0 | | | | 2.4 × 10¹⁴ | — | 0.17 | — | — | — | — | No change |

TABLE 1-continued

| Examples Comparative Examples | Base oils | Epoxy compounds* Kind | Epoxy compounds* Amount (In wt %) | TCP*** Amount (In wt %) | DBPC**** Amount (In wt %) | Kinematic viscosity @ 100° C. (mm²/s) | Miscible Temp. Range with HFC-134a (° C.) Amount of HFC-134a (90 wt %) | Miscible Temp. Range with HFC-134a (° C.) Amount of HFC-134a (97 wt %) | Resistivity @ 25° C. (Ωcm) | Falex test Amount of journal worn (mg) | Hygroscopicity 30° C., 60% (%) | Sealed tube test Oil color | Sealed tube test Catalyst Cu | Sealed tube test Catalyst Fe | Sealed tube test Catalyst Al | Sealed tube test Appearance of test oil |
|---|---|---|---|---|---|---|---|---|---|---|---|---|---|---|---|---|
| Example 43 | 20 | DoDECYLGE | 3.0 | none | none | 11.4 | — | — | $1.1 \times 10^{14}$ | — | 0.11 | — | — | — | — | No change |
| Example 44 | 21 | DECYLGEs | 3.0 | none | none | 5.3 | — | — | $2.5 \times 10^{14}$ | — | 0.16 | — | — | — | — | No change |
| Example 45 | 22 | EPCH | 3.0 | none | none | 9.4 | — | — | $2.9 \times 10^{14}$ | — | 0.20 | — | — | — | — | No change |
| Example 46 | 23 | EP.DODEC. | 3.0 | none | none | 12.5 | — | — | $1.4 \times 10^{14}$ | — | 0.12 | — | — | — | — | No change |
| Example 47 | 2 | PGE | 3.0 | none | none | 11.2 | — | — | $3.8 \times 10^{14}$ | — | 0.20 | — | — | — | — | No change |
| Example 48 | 3 | PGE | 3.0 | none | none | 7.9 | — | — | $3.9 \times 10^{14}$ | — | 0.18 | — | — | — | — | No change |
| Example 49 | 4 | PGE | 3.0 | none | none | 9.8 | — | — | $2.9 \times 10^{14}$ | — | 0.18 | — | — | — | — | No change |
| Example 50 | 5 | PGE | 3.0 | none | none | 28.0 | — | — | $3.0 \times 10^{14}$ | — | 0.16 | — | — | — | — | No change |
| Example 51 | 6 | PGE | 3.0 | none | none | 11.6 | — | — | $3.1 \times 10^{14}$ | — | 0.16 | — | — | — | — | No change |
| Example 52 | 7 | PGE | 3.0 | none | none | 32.0 | — | — | $2.4 \times 10^{14}$ | — | 0.12 | — | — | — | — | No change |
| Example 53 | 1 | s-BuPGE | 3.0 | none | none | 6.0 | — | — | $4.2 \times 10^{14}$ | — | 0.19 | — | — | — | — | No change |
| Example 54 | 1 | t-BuPGE | 3.0 | none | none | 6.0 | — | — | $4.2 \times 10^{14}$ | — | 0.19 | — | — | — | — | No change |
| Example 55 | 1 | DODECYLGE | 3.0 | none | none | 6.0 | — | — | $4.2 \times 10^{14}$ | — | 0.19 | — | — | — | — | No change |
| Example 56 | 1 | DECYLGEs | 3.0 | none | none | 6.0 | — | — | $4.2 \times 10^{14}$ | — | 0.19 | — | — | — | — | No change |
| Example 57 | 1 | EPCH | 3.0 | none | none | 6.0 | — | — | $4.2 \times 10^{14}$ | — | 0.19 | — | — | — | — | No change |
| Example 58 | 1 | EP.DODEC. | 3.0 | none | none | 6.2 | — | — | $4.2 \times 10^{14}$ | — | 0.19 | — | — | — | — | No change |
| Example 59 | 1 | PGE | 1.0 | none | none | 6.0 | — | — | $4.2 \times 10^{14}$ | — | 0.19 | — | — | — | — | No change |
| Example 60 | 1 | PGE | 3.0 | none | 0.2 | 6.0 | — | — | $4.2 \times 10^{14}$ | — | 0.20 | — | — | — | — | No change |
| Example 61 | 2 | s-BuPGE | 3.0 | none | 0.2 | 11.3 | — | — | $3.8 \times 10^{14}$ | — | 0.18 | — | — | — | — | No change |
| Example 62 | 3 | t-BuPGE | 3.0 | none | 0.2 | 7.9 | — | — | $3.9 \times 10^{14}$ | — | 0.18 | — | — | — | — | No change |
| Example 63 | 4 | DODECYLGE | 3.0 | none | 0.2 | 10.0 | — | — | $2.9 \times 10^{14}$ | — | 0.18 | — | — | — | — | No change |
| Example 64 | 5 | DECYLGEs | 3.0 | none | 0.2 | 28.0 | — | — | $3.0 \times 10^{14}$ | — | 0.16 | — | — | — | — | No change |
| Example 65 | 6 | EPCH | 3.0 | none | 0.2 | 11.6 | — | — | $3.1 \times 10^{14}$ | — | 0.16 | — | — | — | — | No change |
| Example 66 | 7 | EP.DODEC. | 3.0 | none | 0.2 | 32.0 | — | — | $2.4 \times 10^{14}$ | — | 0.12 | — | — | — | — | No change |
| Comparative Example 67 | 30 | PGE | 3.0 | none | none | 5.7 | Immiscible | −24−CT** | $2.1 \times 10^{14}$ | 16 | 0.21 | 1 | No change | No change | No change | — |
| Comparative Example 68 | 30 | s-BuPGE | 3.0 | none | none | 5.7 | Immiscible | −25−CT** | $2.4 \times 10^{14}$ | 18 | 0.20 | 1 | No change | No change | No change | — |
| Comparative Example 69 | 30 | t-BuPGE | 3.0 | none | 0.2 | 5.8 | Immiscible | −25−CT** | $2.3 \times 10^{14}$ | 19 | 0.21 | 1 | No change | No change | No change | — |

TABLE 2

| Examples | Base oils | Epoxy compounds* Kind | Epoxy compounds* Amount (In wt %) | TCP*** Amount (In wt %) | DBPC***** Amount (In wt %) | Kinematic viscosity @ 100° C. (mm²/s) | Miscible Temp. Range with HFC-134a (° C.) Amount of HFC-134a (90 wt %) | Miscible Temp. Range with HFC-134a (° C.) Amount of HFC-134a (97 wt %) | Resistivity @ 25° C. (Ωcm) | Falex test Amount of journal worn (mg) | Hygro-scopicity 30° C., 60% (%) | Sealed tube test Oil color | Sealed tube test Catalyst Cu | Sealed tube test Catalyst Fe | Sealed tube test Catalyst Al | Appearance of test oil |
|---|---|---|---|---|---|---|---|---|---|---|---|---|---|---|---|---|
| Comp.Ex. 1 | 24 | none | — | none | none | 5.1 | Immiscible | — | $3.8 \times 10^{15}$ | 23 | 0.01 | — | — | — | — | — |
| Comp.Ex. 2 | 25 | none | — | none | none | 4.8 | Immiscible | — | $6.4 \times 10^{15}$ | 25 | 0.01 | — | — | — | — | — |
| Comp.Ex. 3 | 26 | none | — | none | none | 4.9 | <-70~97 | — | $1.1 \times 10^{11}$ | 40 | 1.31 | — | — | — | — | — |
| Comp.Ex. 4 | 27 | none | — | none | none | 10.8 | <-70~56 | — | $1.2 \times 10^{11}$ | 35 | 1.01 | — | — | — | — | — |
| Comp.Ex. 5 | 28 | none | — | none | none | 10.6 | <-70~64 | — | $5.6 \times 10^{10}$ | 38 | 2.30 | — | — | — | — | — |
| Comp.Ex. 6 | 29 | none | — | none | none | 22.4 | -51~32 | — | $4.8 \times 10^{10}$ | 30 | 1.81 | — | — | — | — | — |
| Comp.Ex. 7 | 30 | none | — | none | none | 6.1 | Immiscible | — | $2.1 \times 10^{14}$ | 25 | 0.21 | 1 | No change | Luster decreased | No change | — |
| Comp.Ex. 8 | 31 | none | — | none | none | 4.9 | Immiscible | — | — | — | — | — | — | — | — | — |
| Comp.Ex. 9 | 32 | none | — | none | none | 5.4 | Immiscible | — | — | — | — | — | — | — | — | — |
| Comp.Ex. 10 | 33 | none | — | none | none | 4.4 | Immiscible | — | — | — | — | — | — | — | — | — |
| Comp.Ex. 11 | 1 | none | — | none | none | 6.2 | -27~CT** | -45~CT** | $4.1 \times 10^{14}$ | 27 | 0.19 | 4 | No change | Luster decreased | No change | — |
| Comp.Ex. 12 | 2 | none | — | none | none | 11.5 | -32~CT** | -60~CT** | $3.8 \times 10^{14}$ | 25 | 0.19 | 4 | No change | Luster decreased | No change | — |
| Comp.Ex. 13 | 3 | none | — | none | none | 8.1 | -28~CT** | -45~CT** | $4.0 \times 10^{14}$ | 26 | 0.19 | 5 | No change | Luster decreased | No change | — |
| Comp.Ex. 14 | 4 | none | — | none | none | 10.0 | <-70~CT** | <-70~CT** | $2.8 \times 10^{14}$ | 22 | 0.17 | 5 | No change | Luster decreased | No change | — |
| Comp.Ex. 15 | 5 | none | — | none | none | 28.2 | -7~75 | -18~90 | $3.0 \times 10^{14}$ | 19 | 0.15 | 3 | No change | Luster decreased | No change | — |
| Comp.Ex. 16 | 6 | none | — | none | none | 11.8 | -25~90 | -36~CT** | $3.2 \times 10^{14}$ | 22 | 0.16 | 3 | No change | Luster decreased | No change | — |
| Comp.Ex. 17 | 7 | none | — | none | none | 32.3 | -5~86 | <-70~CT** | $2.4 \times 10^{14}$ | 18 | 0.13 | 4 | No change | Luster decreased | No change | — |
| Comp.Ex. 18 | 8 | none | — | none | none | 3.8 | -35~CT** | <-70~CT** | $4.5 \times 10^{14}$ | 29 | 0.20 | 4 | No change | Luster decreased | No change | — |
| Comp.Ex. 19 | 9 | none | — | none | none | 9.5 | -45~CT** | <-70~CT** | $3.9 \times 10^{14}$ | 26 | 0.20 | 4 | No change | Luster decreased | No change | — |
| Comp.Ex. 20 | 10 | none | — | none | none | 7.2 | -37~CT** | <-70~CT** | $4.1 \times 10^{14}$ | 26 | 0.18 | 6 | No change | Luster decreased | No change | — |
| Comp.Ex. 21 | 11 | none | — | none | none | 9.1 | <-70~CT** | -25~CT** | $2.5 \times 10^{14}$ | 24 | 0.14 | 4 | No change | Luster decreased | No change | — |
| Comp.Ex. 22 | 12 | none | — | none | none | 22.1 | -11~75 | -38~17 | $2.8 \times 10^{14}$ | 20 | 0.16 | 5 | No change | Luster decreased | No change | — |
| Comp.Ex. 23 | 13 | none | — | none | none | 9.8 | -20~0 | -21~CT** | $3.0 \times 10^{14}$ | 24 | 0.14 | 3 | No change | Luster decreased | No change | — |
| Comp.Ex. 24 | 14 | none | — | none | none | 31.9 | -7~88 | -19~CT** | $2.5 \times 10^{14}$ | 19 | 0.22 | 5 | No change | Luster decreased | No change | — |
| Comp.Ex. 25 | 15 | none | — | none | none | 2.3 | -24~CT** | -38~CT** | $4.2 \times 10^{14}$ | 24 | 0.20 | 4 | No change | Luster decreased | No change | — |
| Comp.Ex. 26 | 16 | none | — | none | none | 3.1 | -30~CT** | -54~CT** | $3.9 \times 10^{14}$ | 22 | 0.18 | 4 | No change | Luster decreased | No change | — |
| Comp.Ex. 27 | 17 | none | — | none | none | 5.5 | -55~CT** | <-70~CT** | $2.5 \times 10^{14}$ | 15 | 0.11 | 4 | No change | Luster decreased | No change | — |
| Comp.Ex. 28 | 18 | none | — | none | none | 10.3 | -34~95 | -60~CT** | $1.4 \times 10^{14}$ | 12 | 0.16 | 5 | No change | Luster decreased | No change | — |
| Comp.Ex. 29 | 19 | none | — | none | none | 6.2 | -47~CT** | <-70~CT** | $2.2 \times 10^{14}$ | 14 | 0.10 | 4 | No change | Luster decreased | No change | — |
| Comp.Ex. 30 | 20 | none | — | none | none | 11.6 | -32~92 | -56~CT** | $1.1 \times 10^{14}$ | 10 | 0.18 | 2 | No change | Luster decreased | No change | — |
| Comp.Ex. 31 | 21 | none | — | none | none | 5.5 | -55~CT** | <-70~CT** | $2.3 \times 10^{14}$ | 2 | 0.18 | 4 | No change | Luster decreased | No change | — |
| Comp.Ex. 32 | 22 | none | — | none | none | 9.6 | -35~76 | -50~CT** | $2.8 \times 10^{14}$ | 20 | 0.12 | 3 | No change | Luster decreased | No change | — |
| Comp.Ex. 33 | 23 | none | — | none | none | 12.7 | -30~68 | <-50~CT** | $1.2 \times 10^{14}$ | 17 | 1.01 | — | — | — | — | — |
| Comp.Ex. 34 | 27 | PGE | 3.0 | none | none | 10.6 | — | — | $1.2 \times 10^{11}$ | — | 1.93 | — | — | — | — | White-turbid |
| Comp.Ex. 35 | 34 | PGE | 3.0 | none | none | 7.0 | — | — | $6.8 \times 10^{10}$ | — | 1.93 | — | — | — | — | White-turbid |
| Comp.Ex. 36 | 34 | s-BuPGE | 3.0 | none | none | 7.0 | — | — | $6.8 \times 10^{10}$ | — | 1.01 | — | — | — | — | White-turbid |
| Comp.Ex. 37 | 34 | t-BuPGE | 3.0 | none | none | 10.7 | — | — | $1.2 \times 10^{11}$ | — | 1.93 | — | — | — | — | White-turbid |
| Comp.Ex. 38 | 34 | DoDECYLGE | 3.0 | none | none | 6.9 | — | — | $6.8 \times 10^{10}$ | — | 1.01 | — | — | — | — | White-turbid |
| Comp.Ex. 39 | 27 | DECYLGEs | 3.0 | none | none | 10.6 | — | — | $1.2 \times 10^{11}$ | — | 1.93 | — | — | — | — | White-turbid |
| Comp.Ex. 40 | 34 | EPCH | 3.0 | none | none | 6.9 | — | — | $1.2 \times 10^{11}$ | — | 1.01 | — | — | — | — | White-turbid |
| Comp.Ex. 41 | 27 | EP.DODEC. | 3.0 | none | none | 10.7 | — | — | $1.2 \times 10^{11}$ | — | 1.01 | — | — | — | — | White-turbid |
| Comp.Ex. 42 | 34 | EP.SOY. | 3.0 | none | none | 7.0 | — | — | $6.8 \times 10^{10}$ | — | 1.93 | — | — | — | — | White-turbid |

TABLE 2-continued

| Examples Comparative Examples | Base oils | Epoxy compounds* Kind | Amount (In wt %) | TCP*** Amount (In wt %) | DBPC**** Amount (In wt %) | Kinematic viscosity @ 100° C. (mm²/s) | Miscible Temp. Range with HFC-134a (° C.) Amount of HFC-134a (90 wt %) | Amount of HFC-134a (97 wt %) | Resistivity @ 25° C. (Ωcm) | Falex test Amount of journal worn (mg) | Hygroscopicity 30° C., 60% (%) | Oil color | Sealed tube test Cu | Catalyst Fe | Al | Appearance of test oil |
|---|---|---|---|---|---|---|---|---|---|---|---|---|---|---|---|---|
| Comp.Ex. 43 | 27 | EP.St.B | 3.0 | none | none | 10.7 | — | — | 1.2 × 10¹¹ | — | 1.01 | — | — | — | — | White-turbid |
| Comp.Ex. 44 | 35 | PGE | 3.0 | none | none | 11.2 | — | — | 1.0 × 10¹¹ | — | 1.10 | — | — | — | — | White-turbid |
| Comp.Ex. 45 | 36 | PGE | 3.0 | none | none | 12.6 | — | — | 1.1 × 10¹¹ | — | 1.07 | — | — | — | — | White-turbid |
| Comp.Ex. 46 | 37 | PGE | 3.0 | none | none | 7.2 | — | — | 6.8 × 10¹¹ | — | 0.47 | — | — | — | — | White-turbid |
| Comp.Ex. 47 | 38 | PGE | 3.0 | none | none | 8.0 | — | — | 4.8 × 10¹¹ | — | 0.63 | — | — | — | — | White-turbid |
| Comp.Ex. 48 | 39 | PGE | 3.0 | none | none | 6.3 | — | — | 8.4 × 10¹⁰ | — | 1.78 | — | — | — | — | White-turbid |
| Comp.Ex. 49 | 39 | PGE | 3.0 | none | none | 7.6 | — | — | 6.6 × 10¹¹ | — | 0.51 | — | — | — | — | White-turbid |
| Comp.Ex. 50 | 40 | PGE | 3.0 | none | none | 11.5 | — | — | 3.8 × 10¹¹ | — | 0.74 | — | — | — | — | White-turbid |
| Comp.Ex. 51 | 41 | PGE | 3.0 | none | none | 11.0 | — | — | 2.6 × 10¹¹ | — | 0.89 | — | — | — | — | White-turbid |
| Comp.Ex. 52 | 42 | PGE | 3.0 | none | none | 10.4 | — | — | 3.8 × 10¹¹ | — | 0.60 | — | — | — | — | White-turbid |
| Comp.Ex. 53 | 43 | PGE | 3.0 | none | none | 16.8 | — | — | 4.1 × 10¹¹ | — | 0.59 | — | — | — | — | White-turbid |
| Comp.Ex. 54 | 44 | PGE | 3.0 | none | none | 11.4 | — | — | 8.7 × 10¹¹ | — | 0.42 | — | — | — | — | White-turbid |
| Comp.Ex. 55 | 45 | PGE | 3.0 | none | none | 14.4 | — | — | 2.1 × 10¹¹ | — | 0.74 | — | — | — | — | White-turbid |
| Comp.Ex. 56 | 46 | PGE | 3.0 | none | none | 6.3 | — | — | 2.5 × 10¹¹ | — | 1.40 | — | — | — | — | White-turbid |
| Comp.Ex. 57 | 39 | S-BuPGE | 3.0 | none | none | 6.3 | — | — | 2.5 × 10¹¹ | — | 1.40 | — | — | — | — | White-turbid |
| Comp.Ex. 58 | 39 | t-BuPGE | 3.0 | none | none | 6.3 | — | — | 2.5 × 10¹¹ | — | 1.40 | — | — | — | — | White-turbid |
| Comp.Ex. 59 | 39 | DODECYLGE | 3.0 | none | none | 6.3 | — | — | 2.5 × 10¹¹ | — | 1.40 | — | — | — | — | White-turbid |
| Comp.Ex. 60 | 39 | DECYLGEs | 3.0 | none | none | 6.3 | — | — | 2.5 × 10¹¹ | — | 1.40 | — | — | — | — | White-turbid |
| Comp.Ex. 61 | 39 | EPCH | 3.0 | none | none | 6.3 | — | — | 2.5 × 10¹¹ | — | 1.40 | — | — | — | — | White-turbid |
| Comp.Ex. 62 | 39 | EP.DODEC. | 3.0 | none | none | 10.5 | — | — | 1.2 × 10¹¹ | — | 1.01 | — | — | — | — | White-turbid |
| Comp.Ex. 63 | 27 | PGE | 3.0 | 1.0 | none | 6.9 | — | — | 6.8 × 10¹⁰ | — | 1.93 | — | — | — | — | White-turbid |
| Comp.Ex. 64 | 34 | PGE | 3.0 | 1.0 | none | 7.1 | — | — | 6.8 × 10¹¹ | — | 0.47 | — | — | — | — | White-turbid |
| Comp.Ex. 65 | 37 | PGE | 3.0 | 1.0 | none | 6.2 | — | — | 8.4 × 10¹⁰ | — | 1.78 | — | — | — | — | White-turbid |
| Comp.Ex. 66 | 39 | PGE | 3.0 | 1.0 | none | 6.1 | — | — | 2.1 × 10¹³ | — | 0.22 | — | — | — | — | White-turbid |
| Comp.Ex. 67 | 47 | PGE | 3.0 | 1.0 | none | 6.0 | — | — | 8.6 × 10¹² | — | 0.28 | — | — | — | — | White-turbid |
| Comp.Ex. 68 | 48 | PGE | 3.0 | 1.0 | none | 6.2 | — | — | 2.1 × 10¹³ | — | 0.22 | — | — | — | — | White-turbid |
| Comp.Ex. 69 | 48 | PGE | 3.0 | none | none | 6.1 | — | — | 8.6 × 10¹² | — | 0.28 | — | — | — | — | White-turbid |
| Comp.Ex. 70 | 49 | PGE | 3.0 | none | none | 6.0 | Immiscible | −10~54 | 6.2 × 10¹² | 25 | 0.30 | — | — | — | — | White-turbid |

*PGE: Phenyl Glycidyl Ether
s-BuPGE: s-Butylphenyl Glycidyl Ether
t-BuPGE: t-Butylphenyl Glycidyl Ether
DODECYLGE: Dodecyl Glycidyl Ether
DECYLGEs: Glycidyl 1,1-Dimethyloctanoate
EPCH: 1,2-Epoxycyclohexane
EP.DODEC.: 1,2-Epoxydodecane
EP.SOY.: Epoxydized Soy Bean Oil
EP.St.B: Epoxydized Butyl Stearate
**CT: Critical temperature of HFC-134a (102° C.)
***TCP: Tricresyl phosphate
****DBPC: di-tert-butyl-P-cresol It is apparent from the results indicated in the Tables 1 and 2 that the refrigerator oils (Examples 1–23 and 67–69) of the present invention are at least miscible with 97% by weight of a refrigerant, HFC-134a, and that the refrigerator oils (Examples 1–23) of the present invention are excellent in miscibility with the refrigerant as compared with those of Comparative Examples 1–2.

Table 2 further shows that the ethers of Comparative Examples 3 and 4 as well as the polyoxypropylene glycols of Comparative Examples 5 and 6 are excellent in miscibility with the refrigerant, but these ethers and glycols are inferior in insulating property thereby rendering them unusable for hermetic type compressors. Still further, Table 2 shows that the ethers and glycols of Comparative Examples 3–6 have hygroscopicity 5–10 times that of the refrigerator oils of Examples 1–69 and are also inferior in electrical insulating property, ice choke, wear resistance, stability and the like to the refrigerator oils of the Examples.

The FALEX wear test shows that the refrigerator oils of Examples 1–23 and 67–69 are at least equal in wear resistance to those of Comparative Examples 3–6.

The refrigerator oils of Comparative Examples 7 and 11–33 which are free from epoxy compounds are equivalent to those of Examples 1–23 and 67–69 of the present invention in miscibility with HFC-134a, insulating property, wear resistance and hygroscopicity, but, as is apparent from the results of the sealed tube test, the refrigerator oils of Comparative Examples 7 and 11–33 are quite inferior in thermal and chemical stability as compared with the refrigerator oils of the present invention.

The refrigerator oils of Comparative Examples 34–70 each of which contains at least a polypropylene glycol monoalkyl ether or a derivative thereof and an epoxy compound have a disadvantage that a precipitate which is insoluble into the base oil and the refrigerant is formed in the refrigerator oils due to deterioration of the epoxy compound during the storage under a high humidity. The formed precipitate makes the refrigerator oil white-turbid and leads to the danger of blocking an expansion valve and/or a capillary tube in a refrigerator system in which the above refrigerator oils of Comparative Examples 34–70 is used. Further, the refrigerator oils of Comparative Examples 34–70 have lower resistivity and higher hygroscopicity than any one of refrigerator oils of the present invention.

On the other hand, the refrigerator oils (Examples 24–69) of the present invention are free from the generation of such a precipitate even if they are stored under a high humidity. Therefore, in a case where the refrigerator oil of the present invention is used in a refrigerator system, there is no danger as mentioned above.

(Effect of the Invention)

As is apparent from the above comparative experiments, the refrigerator oils of the present invention are suitable for use in refrigerators using therein a hydrogen-containing halogenocarbon as a refrigerant and are excellent in electrical insulating property, wear resistance, nonhygroscopicity and thermal and chemical stability. In other words, the refrigerator oils of the present invention excellently have all properties which are important for refrigerator oils.

What is claimed is:

1. A fluid composition for use in refrigerators, which consists of a chlorine-free fluorocarbon refrigerant and a refrigerator oil, and said refrigerator oil consists of as a base oil:

a pentaerythritol ester of formula (1)

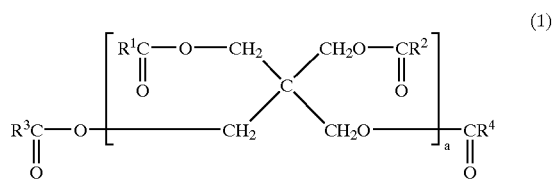

wherein $R^1$–$R^4$ are identical with or different from each other and are each a member selected from the group consisting of straight-chain alkyl groups having 3 to 11 carbon atoms, branched-chain alkyl groups having 3 to 15 carbon atoms and cycloalkyl groups having 6–12 carbon atoms and a is an integer of 2 or 3; and 0.1–5% by weight based on the total amount of said refrigerator oil of at least one epoxy compound selected from the group consisting of phenylglycidyl ether epoxy compounds, alkylphenylglycidyl ether epoxy compounds, glycidyl ester epoxy compounds, and epoxidized fatty acid monoesters; and said base oil has a kinematic viscosity of 2 to 150 cSt at 100° C.

2. A fluid composition for use in refrigerators, which consists of a chlorine-free fluorocarbon refrigerant and a refrigerator oil, and said refrigerator oil consists of as a base oil:

a pentaerythritol ester of formula (1)

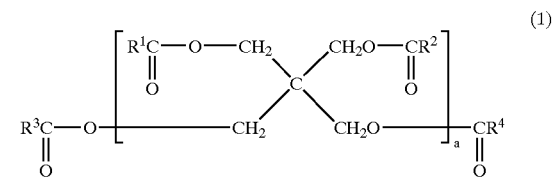

wherein $R^1$–$R^4$ are identical with or different from each other and are each a member selected from the group consisting of straight-chain alkyl groups having 3 to 11 carbon atoms, branched-chain alkyl groups having 3 to 15 carbon atoms and cycloalkyl groups having 6–12 carbon atoms and a is an integer of 2 or 3;

at least one conventional oil selected from the group consisting of paraffinic mineral oils, naphthenic mineral oils, poly∝-olefins and alkylbenzenes; and 0.1–5% by weight based on the total amount of said refrigerator oil of at least one epoxy compound selected from the group consisting of phenylglycidyl ether epoxy compounds, alkylphenylglycidyl ether epoxy compounds, glycidyl ester epoxy compounds, and epoxidized fatty acid monoesters; and said base oil has a kinematic viscosity of 2 to 150 cSt at 100° C.

3. A fluid composition for use in refrigerators, which consists of a chlorine-free fluorocarbon refrigerant and a refrigerator oil, and said refrigerator oil consists of as a base oil:

a pentaerythritol ester of formula (1)

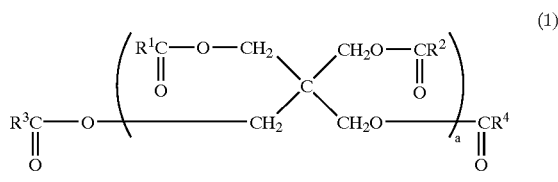

(1)

wherein $R^1$–$R^4$ are identical with or different from each other and are each a member selected from the group consisting of straight-chain alkyl groups having 3 to 11 carbon atoms, branched-chain alkyl groups having 3 to 15 carbon atoms and cycloalkyl groups having 6–12 carbon atoms and a is an integer of 2 or 3;

0.1–5% by weight based on the total amount, of said refrigerator oil of at least one epoxy compound selected from the group consisting of phenylglycidyl ether epoxy compounds, alkylphenylglycidyl ether epoxy compounds, glycidyl ester epoxy compounds, and epoxidized fatty acid monoesters; and at least one additive selected from the group consisting of phenol antioxidants, amine antioxidants, wear resistant additives, extreme pressure agents, oiliness improvers, anti-foaming agents and metal inactivators; and said base oil has a kinematic viscosity of 2 to 150 cSt at 100° C.

4. A fluid composition for use in refrigerators, which consists of a chlorine-free fluorocarbon refrigerant and a refrigerator oil, and said refrigerator oil consists of as a base oil:

a pentaerythritol ester of formula (1)

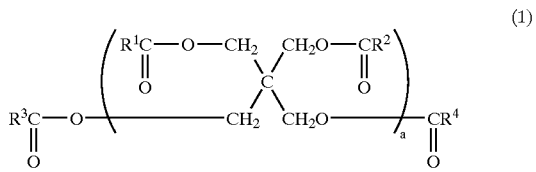

(1)

wherein $R^1$–$R^4$ are identical with or different from each other and are each a member selected from the group consisting of straight-chain alkyl groups having 3 to 11 carbon atoms, branched-chain alkyl groups having 3 to 15 carbon atoms and cycloalkyl groups having 6–12 carbon atoms and a is an integer of 2 or 3;

0.1–5% by weight based on the total amount of said refrigerator oil of at least one epoxy compound selected from the group consisting of phenylglycidyl ether epoxy compounds, alkylphenylglycidyl ether epoxy compounds, glycidyl ester epoxy compounds, and epoxidized fatty acid monoesters; and at least one phosphorus compound selected from the group consisting of phosphoric esters, acid phosphoric esters, amine salts of acid phosphoric esters, chlorinated phosphoric esters, and phosphorous esters; and said base oil has a kinematic viscosity of 2 to 150 cSt at 100° C.

5. A fluid composition for use in refrigerators, which consists of a chlorine-free fluorocarbon refrigerant and a refrigerator oil, and said refrigerator oil consists of as a base oil:

a pentaerythritol ester of formula (1)

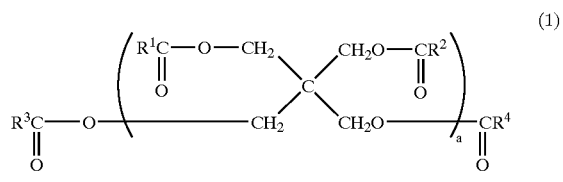

(1)

wherein $R^1$–$R^4$ are identical with or different from each other and are each a member selected from the group consisting of straight-chain alkyl groups having 3 to 11 carbon atoms, branched-chain alkyl groups having 3 to 15 carbon atoms and cycloalkyl groups having 6–12 carbon atoms and a is an integer of 2 or 3; and at least one conventional oil selected from the group consisting of paraffinic mineral oils, naphthenic mineral oils, poly∝-olefins and alkylbenzenes;

0.1–5% by weight based on the total amount of said refrigerator oil of at least one epoxy compound selected from the group consisting of phenylglycidyl ether epoxy compounds, alkylphenylglycidyl ether epoxy compounds, glycidyl ester epoxy compounds, and epoxidized fatty acid monoesters; and at least one additive selected from the group consisting of phenol antioxidants, amine antioxidants, wear resistant additives, extreme pressure agents, oiliness improvers, anti-foaming agents and metal inactivators; and said base oil has a kinematic viscosity of 2 to 150 cSt at 100° C.

6. A fluid composition for use in refrigerators, which consists of a chlorine-free fluorocarbon refrigerant and a refrigerator oil, and said refrigerator oil consists of as a base oil:

a pentaerythritol ester of formula (1)

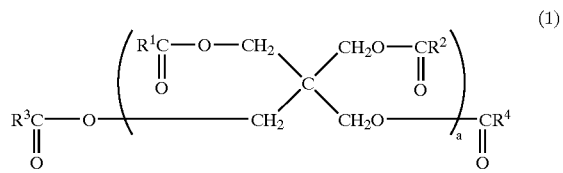

(1)

wherein $R^1$–$R^4$ are identical with or different from each other and are each a member selected from the group consisting of straight-chain alkyl groups having 3 to 11 carbon atoms, branched-chain alkyl groups having 3 to 15 carbon atoms and cycloalkyl groups having 6–12 carbon atoms and a is an integer of 2 or 3;

at least one conventional oil selected from the group consisting of paraffinic mineral oils, naphthenic mineral oils, poly∝-olefins and alkylbenzenes;

0.1–5% by weight based on the total amount of said refrigerator oil of at least one epoxy compound selected from the group consisting of phenylglycidyl ether epoxy compounds, alkylphenylglycidyl ether epoxy compounds, glycidyl ester epoxy compounds, and epoxidized fatty acid monoesters; and at least one phosphorus compound selected from the group consisting of phosphoric esters, acid phosphoric esters, amine salts of acid phosphoric esters, chlorinated phosphoric esters, and phosphorous esters; and said base oil has a kinematic viscosity of 2 to 150 cSt at 100° C.

7. A fluid composition for use in refrigerators, which consists of a chlorine-free fluorocarbon refrigerant and a refrigerator oil, and said refrigerator oil consists of as a base oil:

a pentaerythritol ester of formula (1)

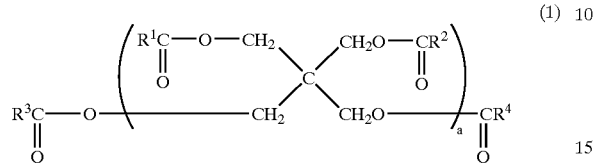

wherein $R^1$–$R^4$ are identical with or different from each other and are each a member selected from the group consisting of straight-chain alkyl groups having 3 to 11 carbon atoms, branched-chain alkyl groups having 3 to 15 carbon atoms and cycloalkyl groups having 6–12 carbon atoms and a is an integer of 2 or 3;

0.1–5% by weight based on the total amount of said refrigerator oil of at least one epoxy compound selected from the group consisting of phenylglycidyl ether epoxy compounds, alkylphenylglycidyl ether epoxy compounds, glycidyl ester epoxy compounds, and epoxidized fatty acid monoesters;

at least one phosphorus compound selected from the group consisting of phosphoric esters, acid phosphoric esters, amine salts of acid phosphoric esters, chlorinated phosphoric esters, and phosphorous esters; and at least one additive selected from the group consisting of phenol antioxidants, amine antioxidants, wear resistant additives, extreme pressure agents, oiliness improvers, anti-foaming agents and metal inactivators; and said base oil has a kinematic viscosity of 2 to 150 cSt at 100° C.

8. A fluid composition for use in refrigerators, which consists of a chlorine-free fluorocarbon refrigerant and a refrigerator oil, and said refrigerator oil consists of as a base oil:

a pentaerythritol ester of formula (1)

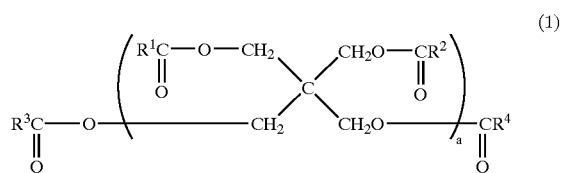

wherein $R^1$–$R^4$ are identical with or different from each other and are each a member selected from the group consisting of straight-chain alkyl groups having 3 to 11 carbon atoms, branched-chain alkyl groups having 3 to 15 carbon atoms and cycloalkyl groups having 6–12 carbon atoms and a is an integer of 2 or 3;

at least one conventional oil selected from the group consisting of paraffinic mineral oils, naphthenic mineral oils, poly∝-olefins and alkylbenzenes;

0.1–5% by weight based on the total amount of said refrigerator oil of at least one epoxy compound selected from the group consisting of phenylglycidyl ether epoxy compounds, alkylphenylglycidyl ether epoxy compounds, glycidyl ester epoxy compounds, and epoxidized fatty acid monoesters; and at least one phosphorus compound selected from the group consisting of phosphoric esters, acid phosphoric esters, amine salts of acid phosphoric esters, chlorinated phosphoric esters, and phosphorous esters; and at least one additive selected from the group consisting of phenol antioxidants, amine antioxidants, wear resistant additives, extreme pressure agents, oiliness improvers, anti-foaming agents and metal inactivators; and said base oil has a kinematic viscosity of 2 to 150 cSt at 100° C.

* * * * *